(12) United States Patent
Nguyen et al.

(10) Patent No.: US 8,040,896 B2
(45) Date of Patent: Oct. 18, 2011

(54) SERVICE SELECTION IN A SHARED ACCESS NETWORK USING VIRTUAL NETWORKS

(75) Inventors: Han Q. Nguyen, Marlboro, NJ (US);
Tayfun Cataltepe, Fair Haven, NJ (US);
Samir S. Saad, Long Branch, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 12/313,846

(22) Filed: Nov. 25, 2008

(65) Prior Publication Data
US 2009/0080437 A1 Mar. 26, 2009

Related U.S. Application Data

(63) Continuation of application No. 10/748,882, filed on Dec. 30, 2003, now Pat. No. 7,467,227.

(60) Provisional application No. 60/319,826, filed on Dec. 31, 2002.

(51) Int. Cl.
*H04L 12/56* (2006.01)

(52) U.S. Cl. ............ 370/395.31; 370/235; 370/392

(58) Field of Classification Search ............ 370/356, 370/389, 395.31
See application file for complete search history.

(56) References Cited

U.S. PATENT DOCUMENTS

| | | | |
|---|---|---|---|
| 5,325,362 A | 6/1994 | Aziz | |
| 5,500,860 A | 3/1996 | Perlman et al. | |
| 5,633,865 A | 5/1997 | Short | |
| 5,737,328 A | 4/1998 | Norman et al. | |
| 5,790,548 A | 8/1998 | Sistanizadeh et al. | |
| 5,796,740 A | 8/1998 | Perlman et al. | |
| 5,862,325 A | 1/1999 | Reed et al. | |
| 5,875,186 A | 2/1999 | Belanger et al. | |
| 5,914,938 A | 6/1999 | Brady et al. | |
| 5,918,019 A | 6/1999 | Valencia | |
| 5,959,990 A | 9/1999 | Frantz et al. | |
| 5,991,292 A | 11/1999 | Focsaneanu et al. | |
| 6,005,931 A | 12/1999 | Neyman et al. | |
| 6,006,272 A | 12/1999 | Aravamudan et al. | |
| 6,023,724 A | 2/2000 | Bhatia et al. | |
| 6,029,203 A | 2/2000 | Bhatia et al. | |
| 6,049,533 A | 4/2000 | Norman et al. | |
| 6,058,421 A | 5/2000 | Fijolek et al. | |
| 6,073,178 A | 6/2000 | Wong et al. | |
| 6,088,717 A | 7/2000 | Reed et al. | |
| 6,092,110 A | 7/2000 | Maria et al. | |

(Continued)

FOREIGN PATENT DOCUMENTS

WO 98/24224 6/1998

(Continued)

OTHER PUBLICATIONS

Notice of Allowance issued in connection with U.S. Appl. No. 10/748,882 on Jul. 11, 2008 (7 pages).

(Continued)

*Primary Examiner* — Dang Ton
*Assistant Examiner* — Pamit Kaur
(74) *Attorney, Agent, or Firm* — Hanley, Flight & Zimmerman, LLC.

(57) ABSTRACT

The present invention discloses a method and architecture for enabling multiple services or service providers to share the facilities of an access network infrastructure that provides physical connectivity to subscribers.

17 Claims, 6 Drawing Sheets

U.S. PATENT DOCUMENTS

| | | |
|---|---|---|
| 6,154,776 A | 11/2000 | Martin |
| 6,163,807 A | 12/2000 | Hodgkinson et al. |
| 6,219,697 B1 | 4/2001 | Lawande et al. |
| 6,240,091 B1 | 5/2001 | Ginzboorg et al. |
| 6,263,369 B1 | 7/2001 | Sitaraman et al. |
| 6,301,669 B2 | 10/2001 | Boden et al. |
| 6,308,213 B1 | 10/2001 | Valencia |
| 6,353,614 B1 | 3/2002 | Borella et al. |
| 6,393,484 B1 | 5/2002 | Massarani |
| 6,396,845 B1 | 5/2002 | Sugita |
| 6,427,170 B1 | 7/2002 | Sitaraman et al. |
| 6,427,174 B1 | 7/2002 | Sitaraman et al. |
| 6,434,627 B1 | 8/2002 | Millet et al. |
| 6,438,100 B1 | 8/2002 | Halpern et al. |
| 6,442,588 B1 | 8/2002 | Clark et al. |
| 6,466,964 B1 | 10/2002 | Leung et al. |
| 6,484,210 B1 | 11/2002 | Adriano et al. |
| 6,487,605 B1 | 11/2002 | Leung |
| 6,490,289 B1 | 12/2002 | Lou et al. |
| 6,510,144 B1 | 1/2003 | Dommety et al. |
| 6,512,754 B2 | 1/2003 | Feder et al. |
| 6,523,068 B1 | 2/2003 | Beser et al. |
| 6,535,493 B1 | 3/2003 | Lee et al. |
| 6,553,028 B1 | 4/2003 | Tang et al. |
| 6,553,423 B1 | 4/2003 | Chen |
| 6,556,584 B1 | 4/2003 | Horsley et al. |
| 6,574,214 B1 | 6/2003 | Khalil et al. |
| 6,584,071 B1 | 6/2003 | Kodialam et al. |
| 6,598,083 B1 | 7/2003 | Remer et al. |
| 6,603,758 B1 | 8/2003 | Schmuelling et al. |
| 6,608,832 B2 | 8/2003 | Forslow |
| 6,628,654 B1 | 9/2003 | Albert et al. |
| 6,633,761 B1 | 10/2003 | Singhal et al. |
| 6,647,418 B1 | 11/2003 | Maria et al. |
| 6,650,641 B1 | 11/2003 | Albert et al. |
| 6,651,105 B1 | 11/2003 | Bhagwat et al. |
| 6,693,878 B1 | 2/2004 | Daruwalla et al. |
| 6,697,354 B1 | 2/2004 | Borella et al. |
| 6,708,187 B1 | 3/2004 | Shanumgam et al. |
| 6,725,264 B1 | 4/2004 | Christy |
| 6,735,190 B1 | 5/2004 | Chuah et al. |
| 6,789,118 B1 | 9/2004 | Rao |
| 6,795,857 B1 | 9/2004 | Leung et al. |
| 6,798,776 B1 | 9/2004 | Cheriton et al. |
| 6,850,521 B1 | 2/2005 | Kadambi et al. |
| 6,865,184 B2 | 3/2005 | Thubert et al. |
| 6,865,613 B1 | 3/2005 | Millet et al. |
| 7,299,296 B1 | 11/2007 | Lo et al. |
| 7,467,227 B1 * | 12/2008 | Nguyen et al. ............... 709/239 |
| 7,583,665 B1 * | 9/2009 | Duncan et al. ............... 370/389 |
| 2001/0019557 A1 | 9/2001 | Hrastar et al. |
| 2001/0023446 A1 | 9/2001 | Balogh |
| 2001/0044893 A1 | 11/2001 | Skemer |
| 2002/0122394 A1 * | 9/2002 | Whitmore et al. ............ 370/328 |
| 2002/0141418 A1 | 10/2002 | Ben-Dor et al. |
| 2002/0143955 A1 | 10/2002 | Shimada et al. |
| 2002/0165972 A1 | 11/2002 | Chien et al. |
| 2002/0184388 A1 | 12/2002 | Yaseen et al. |
| 2003/0014764 A1 * | 1/2003 | Saladino et al. ............. 725/111 |
| 2003/0039237 A1 | 2/2003 | Forslow |
| 2003/0056001 A1 | 3/2003 | Mate et al. |
| 2003/0058885 A1 | 3/2003 | Sorenson et al. |
| 2003/0105763 A1 | 6/2003 | Chatfield et al. |
| 2003/0123421 A1 | 7/2003 | Feige et al. |
| 2003/0145104 A1 * | 7/2003 | Boden et al. ................. 709/238 |
| 2003/0161295 A1 | 8/2003 | Shah et al. |
| 2004/0022255 A1 * | 2/2004 | Chen et al. ................... 370/401 |
| 2004/0202126 A1 | 10/2004 | Leung et al. |
| 2004/0213260 A1 | 10/2004 | Leung et al. |
| 2004/0260752 A1 | 12/2004 | Chandra et al. |
| 2005/0030959 A1 | 2/2005 | Kunze et al. |
| 2005/0060582 A1 | 3/2005 | Choi et al. |

FOREIGN PATENT DOCUMENTS

| | | |
|---|---|---|
| WO | 99/33211 | 7/1999 |
| WO | 99/52032 | 10/1999 |
| WO | 00/05684 | 2/2000 |
| WO | 01/71567 | 9/2001 |
| WO | 01/71982 | 9/2001 |
| WO | 01/71983 | 9/2001 |
| WO | 01/71984 | 9/2001 |
| WO | 01/72003 | 9/2001 |
| WO | 01/72013 | 9/2001 |

OTHER PUBLICATIONS

Office action issued in connection with U.S. Appl. No. 10/748,882 on Dec. 13, 2007 (7 pages).
Notice of Allowance issued in connection with U.S. Appl. No. 09/812,323 on Jan. 27, 2006 (9 pages).
Office action issued in connection with U.S. Appl. No. 09/812,323 on Jun. 3, 2005 (6 pages).
Office action issued in connection with U.S. Appl. No. 09/812,323 on Jul. 15, 2004 (9 pages).
Perkins, C. E., "Using DHCP with Computers That Move", Wireless Networks. (Oct. 1, 1995), pp. 341-353.
Blankers, P., "Network Solution for Internet Access Service", Ericsson Review. (Jan. 1, 1998), pp. 4-13.
International Search Report dated Jul. 19, 2001 issued in connection with International Application No. PCT/US01/08846, 2 pages.
International Search Report dated Jul. 19, 2001 issued in connection with International Application No. PCT/US/01/08849, 2 pages.
International Search Report dated Jul. 19, 2001 issued in connection with International Application No. PCT/US01/08841, 3 pages.
International Search Report dated Jul. 19, 2001 issued in connection with International Application No. PCT/US01/08985, 3 pages.
International Search Report dated Jul. 19, 2001 issued in connection with International Application No. PCT/US01/08986, 3 pages.
International Search Report dated Jul. 19, 2001 issued in connection with International Application No. PCT/US01/08822, 3 pages.
Office action issued in connection with U.S. Appl. No. 09/812,509 on Jun. 16, 2005 (11 pages).
Office action issued in connection with U.S. Appl. No. 09/812,509 on Jul. 15, 2004 (8 pages).
International Preliminary Examination Report dated Dec. 12, 2002 issued in connection with International Application No. PCT/US01/08846, 2 pages.
International Preliminary Examination Report dated Nov. 27, 2001 issued in connection with International Application No. PCT/US01/08849, 3 pages.
International Preliminary Examination Report dated Nov. 23, 2001 issued in connection with International Application No. PCT/US01/08841, 3 pages.
International Preliminary Examination Report dated Sep. 1, 2003 issued in connection with International Application No. PCT/US01/08985, 5 pages.
International Preliminary Examination Report dated Jan. 8, 2001 issued in connection with International Application No. PCT/US01/08986, 3 pages.
International Preliminary Examination Report dated Jan. 18, 2002 issued in connection with International Application No. PCT/US01/08822, 3 pages.

* cited by examiner

SERVICE SELECTION IN A SHARED ACCESS NETWORK USING VIRTUAL NETWORKS

This application is a continuation of U.S. application Ser. No. 10/748,882, filed Dec. 30, 2003, now U.S. Pat. No. 7,467,227, which claims priority to U.S. Provisional Application Ser. No. 60/319,826, filed on Dec. 31, 2002, the contents of which are hereby incorporated by reference herein. This application is related to commonly assigned U.S. application Ser. No. 09/812,323, entitled "SERVICE SELECTION IN A SHARED ACCESS NETWORK USING POLICY ROUTING," filed on Mar. 20, 2001, now U.S. Pat. No. 7,065,578 and U.S. application Ser. No. 09/812,509, entitled "MANAGED ACCESS POINT FOR SERVICE SELECTION IN A SHARED ACCESS NETWORK," filed on Mar. 20, 2001, both of which are incorporated by reference herein.

FIELD OF THE INVENTION

The present invention relates generally to communication network services, and more particularly, to providing multiple services in a communication network.

BACKGROUND

Customers of communication network services often desire access to a plurality of different services and different service providers. For example, when using a dial-up connection to a packet-switched network such as the Internet, a customer can choose from multiple service providers by dialing different telephone numbers in the PTSN. The physical path from the customer to the customer's Internet Service Provider (ISP) is dedicated to the connection for the duration of the telephone call. The ISP assigns an IP address to the customer and can link the authenticated customer and the assigned IP address to the physical address (e.g., dial-up modem) used by the customer. With this linkage, the ISP can ensure the customer only uses the address authorized by the ISP and can use the customer's IP address to manage access to the ISP's services. The physical connection between a customer and the ISP, as well as the linkage to IP address assignment and customer authentication is terminated when the dial-up connection is terminated.

Constrained by the physical capacity of these temporary connections across the PTSN, many providers are moving to high-speed access architectures (e.g., digital subscriber line (DSL), wireless, satellite, or cable) that provide dedicated physical connectivity directly to the subscriber and under the control of the ISP. These alternatives to shared access through the switched telephone network, however, do not lend themselves to shared access by multiple services and/or service providers.

SUMMARY OF THE INVENTION

In view of the above, it is an object of the present invention to enable multiple services or service providers to share the facilities of an access network infrastructure providing physical connectivity to subscribers. In accordance with an embodiment of the invention, data traffic destined to leave an access network infrastructure is mapped to one of a plurality of virtual networks, for example using a label switching protocol like Multiprotocol Label Switching (MPLS). Each virtual network can define a different logical network within the access network infrastructure architecture with different topologies and different routing policy controls. The admission criteria applied to the data traffic entering a virtual network advantageously need not be interface-based; rather, the criteria can be based on a policy decision, for example including considerations such as the source address or other packet header information. Conventional destination-based routing tables can be checked prior to mapping the data traffic to a virtual network, thereby advantageously providing "local" access using destination-based routing through the access network infrastructure to the addresses of "local" hosts/services. Moreover, return data traffic need not be mapped to a virtual network; thus conventional destination based routing can be used to direct traffic back to a subscriber connected to the access network infrastructure.

For example, a virtual network can be associated with one of a plurality of service networks, each of which is connected to one or more point-of-connection locations in the associated virtual network. Data traffic can be policy filtered at an ingress node in the access network, for example based on source addresses associated with particular service networks to which a customer is subscribed, and mapped to a virtual network based on the policy decision. Data traffic that is not destined for a location outside the access network is advantageously not policy filtered and is instead routed through the access network using conventional destination-based routing. Also, return data traffic from a service network need not return through a corresponding virtual network but, in accordance with one embodiment of the invention, can be routed back to subscribers using conventional destination-based routing.

Accordingly, the present invention provides a method and architecture that supports scalable simultaneous access to multiple services through a common access network infrastructure while advantageously maintaining the ability to provide "local" services through the access infrastructure itself. Moreover, the present invention does not need to rely on any single point-of-connection with a service network to handle policy filtering. Nor does it incur any extra router hops to forward traffic to an appropriate point-of-connection location.

The above and further advantages of the present invention will be apparent to those of ordinary skill in the art by reference to the following detailed description and the accompanying drawings.

DETAILED DESCRIPTION OF THE PREFERRED EMBODIMENTS

Figure 1:
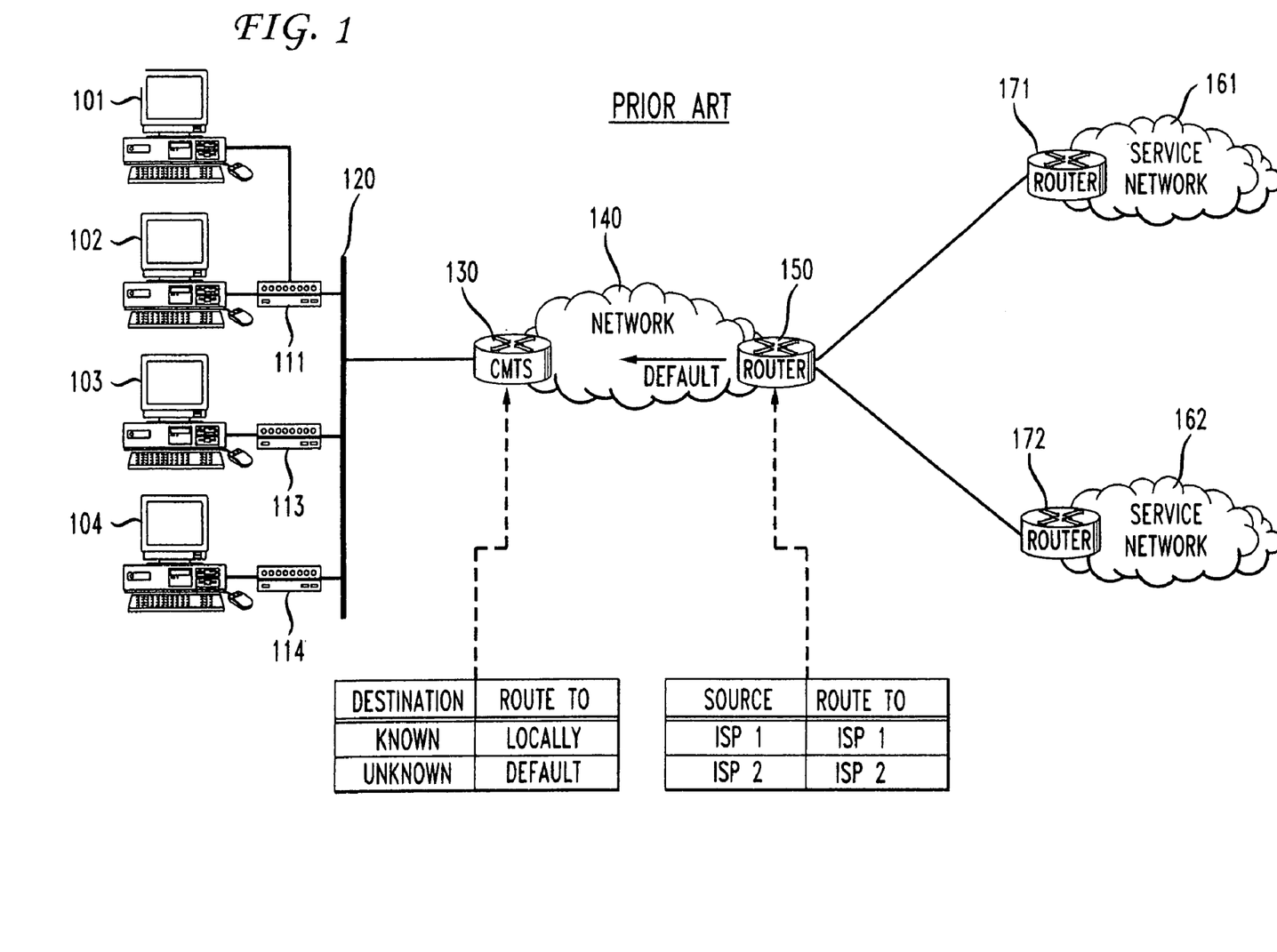
FIG. 1 illustrates an interconnection of packet-switched service networks and an access network, in accordance with utility patent application Ser. No. 09/812,323, filed on Mar. 20, 2001.

FIG. 1 illustrates an interconnection of packet-switched service networks and an access network, in accordance with the invention disclosed in co-pending commonly-assigned Utility patent application Ser. No. 09/812,323, entitled "SERVICE SELECTION IN A SHARED ACCESS NETWORK USING POLICY ROUTING," filed on Mar. 20, 2001 and which is incorporated by reference herein. A plurality of subscribers operating network access devices 101, 102, 103, ... 104, such as a personal computer or other information appliance, are provided access to communication network services, which are facilitated by a plurality of packet-switched data networks, shown in FIG. 1 as 161 and 162. Packet-switched data networks 161 and 162, referred to herein as "service networks," offer access to different services and/or operated by different service providers. Subscribers are assigned network addresses from address blocks associated with a particular service network. The network access devices 101 . . . 104 use network interface units 111, 113, . . . 114, e.g., a modem, to connect to an access network infrastructure—shown in FIG. 1 as a hybrid fiber coaxial (HFC) access network 120 connecting the devices to a Cable Modem Termination System (CMTS) 130 with access to a regional broadband access network 140. Situated at the edge of the access network infrastructure are one or more policy routers 150. In accordance with the invention described in the above-referenced patent application, and as illustrated in FIG. 1, the policy router 150 uses a policy based on the source address of the data packets to determine to which service network to forward the packets. This is depicted in a table in FIG. 1. Where service network 161 is operated by service provider "ISP 1", data packets with a source address allocated to subscribers of ISP 1 are forwarded to a router 171 in service network 161. Likewise, where service network 162 is operated by service provider "ISP 2", data packets with a source address allocated to subscribers of ISP 2 are forwarded to a router 172 in service network 162. The CMTS 130, on the other hand, routes traffic from the network access devices 101 . . . 104 in accordance with the other table shown in FIG. 1. The CMTS 130 can route packets to addresses of destinations "local" to the regional broadband access network 140 and, thereby, provide access to what the inventors refer to as "local" services. Packets addressed to destinations unknown to the regional broadband access network 140 are routed to a policy router 150. Return traffic from the service networks 161, 162 can be routed normally. Accordingly, the network access devices advantageously may be used in communication network services with a service or service provider that is separate from the operator of the access network infrastructure.

The embodiment disclosed in FIG. 1, however, it disadvantageous in that policy router 150 is a single point-of-connection ("POC") for all the service providers offering service to the subscribers. No diversity in service network connectivity is provided; no redundancy for service network connections into the region; no load balancing is provided for traffic to a service network. Policy decisions need to be provisioned, and reconfigured, centrally on the single policy router 150. Moreover, the capacity and performance of policy router 150 becomes very critical to support the large number of policy filtering decisions that may be required in a region. Adding multiple policy routers that are interconnected, as disclosed in co-pending commonly assigned Utility patent application Ser. No. 09/812,509, entitled "MANAGED ACCESS POINT FOR SERVICE SELECTION IN A SHARED ACCESS NETWORK," filed on Mar. 20, 2001 and which is incorporated by reference herein, while remedying some of the problems discussed above, also has its own disadvantages. For example, although service networks with connectivity to two POC policy routers will benefit from load balancing, traffic to service providers with a single connection will incur an extra router hop half the time. Moreover, service network link failures still require significant reconfiguration.

Figure 2:
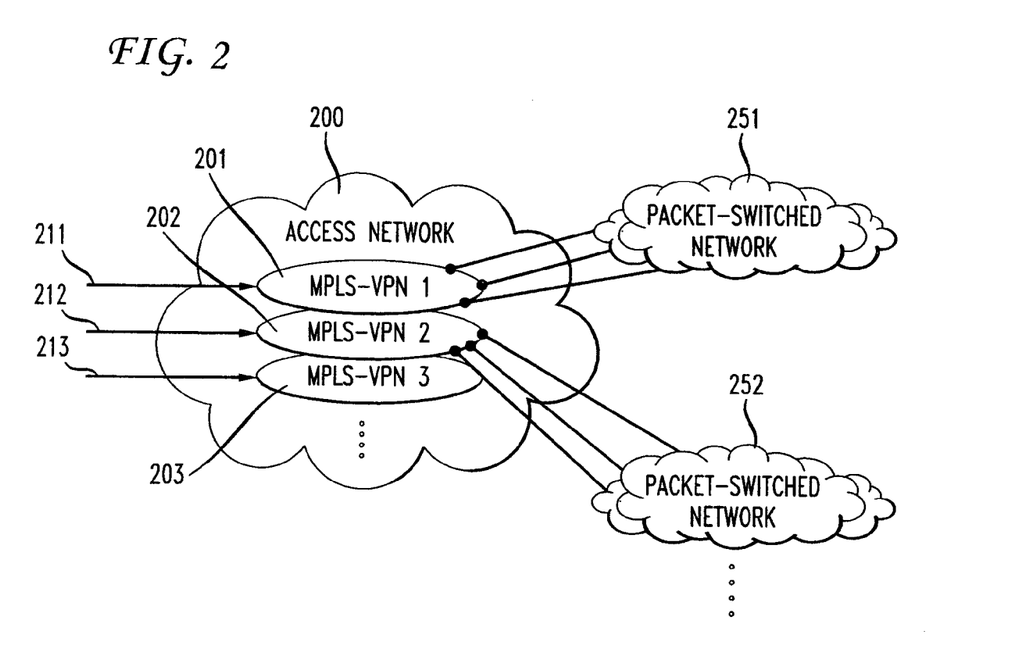
FIG. 2 is a conceptual representation of an interconnection of packet-switched service networks and an access network embodying principles of the invention.

FIG. 2 is a conceptual representation of an interconnection of packet-switched networks 251 and 252 and an access network 200 embodying principles of the present invention which overcomes the above-mentioned disadvantages. In accordance with an embodiment of the invention, data traffic 211, 212, . . . 213 destined to leave the access network infrastructure 200 is mapped to one of a plurality of virtual networks 201, 202, . . . 203. Each virtual network 201, 202, . . . 203 can define a different logical network within the access network infrastructure architecture with different topologies and different routing policy controls. The admission criteria applied to the data traffic 211, 212, . . . 213 entering a virtual network advantageously need not be interface-based—rather, the criteria can be based on a policy decision, for example including considerations such as the source address or other packet header information. For example, the source address allocated to a subscriber can be associated with a service provided by one of the service networks 251, 252, etc. Data traffic having such a source address can be policy filtered at an ingress node and mapped to any one of the plurality of virtual networks 201, 202, . . . 203 based on the policy filtering decision. Each service network, e.g., 251, is connected to one or more point-of-connection locations in the associated virtual network, e.g., 201. Each service network 251, . . . 252 can connect to as many point-of-connection locations as they choose, the corresponding virtual networks 201, 202, . . . 203 being defined to include the chosen point-of-connection locations. Data traffic 211, 212, . . . 213 then leaving the access network 200 is routed though the corresponding virtual network 201, 202, . . . 203, to one of the point-of-connection locations and forwarded to the appropriate service network 251, . . . 252. Accordingly, the different virtual networks 201, . . . 203 advantageously provide separate default routes for traffic 251, . . . 252 to connect to more than one point-of-connection location for load balancing purposes.

Data traffic having a destination address local to the access network 200, as well as return traffic from a service network 251 back to subscribers connected to the access network 200, can advantageously be routed using conventional destination-based routing techniques. Conventional destination-based routing tables can be checked before mapping the data traffic to a virtual network. Such routing tables can be used to handle destination-based routing of "local" traffic and return traffic from a service network 251, . . . 252. Admission control to the virtual networks 201, 202, . . . 203 can be limited to out-bound data traffic from subscribers. Alternatively, local routes through the access network 200 can be represented as a separate default virtual network. Return traffic from a service network 251, . . . 252 can also be mapped to the default virtual network.

An advantageous technique of mapping policy-filtered data traffic to a virtual network is by using a label switching protocol such as Multiprotocol Label Switching ("MPLS"). See E. Rosen et al., "Multiprotocol Label Switching Architecture," IETF RFC 3031, Network Working Group, January 2001; E. Rosen et al., "MPLS Label Stack Encoding," IETF RFC 3032, Network Working Group, January 2001, which are incorporated by reference herein. In contrast to conventional Internet destination-based routing in which packets are assigned to a forwarding equivalence class ("FEC") based on a partitioning of destination addresses, MPLS permits a provider edge ("PE") router to assign a label to a packet which explicitly specifies an FEC and, accordingly, the route that the packet will take through the network. The labeled packets are forwarded by what are referred to in the art as label switching routers ("LSRs") which need only read the labels and need not analyze the underlying network layer packet headers. Label switching forwarding tables can be constructed to create virtual networks across an IP backbone between PE routers. See e.g. E. Rosen, Y. Rekhter, "BGP/MPLS VPNs," IETF RFC 2547, Network Working Group, March 1999; B. Gleeson et al., "A Framework for IP Based Virtual Private Networks," IETF RFC 2764, Network Working Group, February 2000, which are incorporated by reference herein. Each virtual network is associated with one or more virtual network routing or forwarding instances ("VRFs"), which typically consist of an IP routing table, a derived forwarding table, and a set of identified router interfaces that utilize the forwarding table. Each router maintains a separate routing and forwarding table for each VRF, thereby preventing packets from being sent outside the virtual network. Extensions to a protocol such as the Border Gateway Protocol (BGP) can be used to distribute the virtual network routing information.

Figure 3:
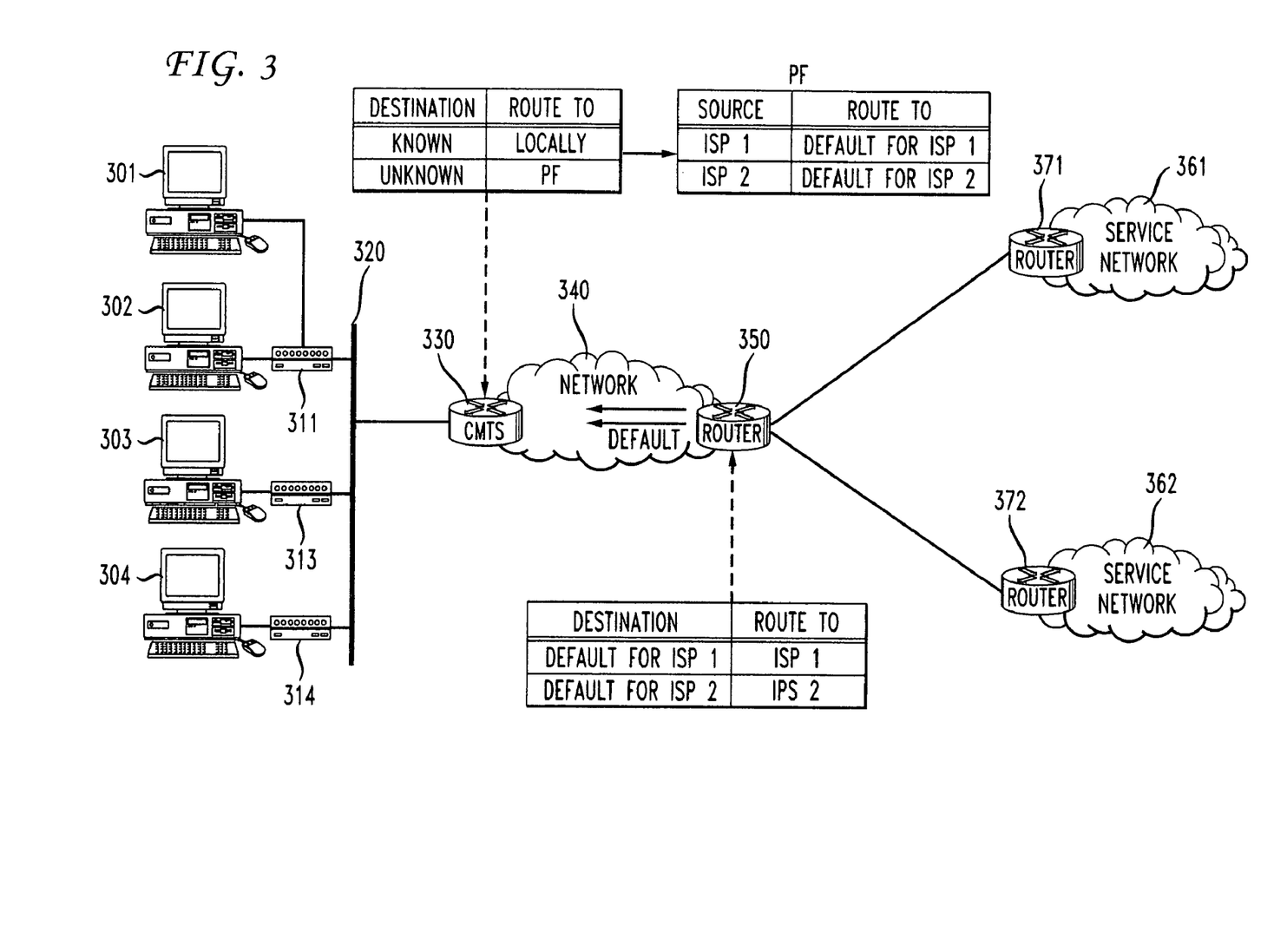
FIG. 3 illustrates an interconnection of packet-switched service networks and an access network, in accordance with an embodiment of the invention.

FIG. 3 is a diagram of an embodiment illustrating the invention in contrast to FIG. 1. As in FIG. 1, a plurality of subscribers operating network access devices 301, 302, 303, . . . 304 are provided access to communication network services, which are facilitated by a plurality of packet-switched data networks, shown in FIG. 3 as 361 and 362. Packet-switched data networks 361 and 362, referred to again as "service networks," offer access to different services and/or are operated by different service providers. For example, service network 361 could provide packet-switched connectivity to public data networks such as the Internet while service network 362 could offer packet-switched telephony service (or the same public data connectivity, but from a different service provider). The service networks, as is well known in the art, utilize a network addressing scheme to route datagrams to and from hosts: for example, where the service networks utilize the TCP/IP protocol suite, Internet Protocol (IP) addresses are assigned to each host and utilized in the process of routing packets from a source to a destination in the networks. See, e.g., "INTERNET PROTOCOL," IETF Network Working Group, RFC 791 (September 1981); S. Deering, R. Hinden, "Internet Protocol, Version 6 (IPv6) Specification," IETF Network Working Group, RFC 188 (December 1995). The invention shall be described herein with particular reference to the TCP/IP protocol suite and IP addresses, although those skilled in the art would readily be able to implement the invention using any of a number of different communication protocols.

The network access devices 301 . . . 304 are typically customer premises equipment (CPE) such as a personal computer, information appliance, personal data assistant, data-enabled wireless handset, or any other type of device capable of accessing information through a packet-switched data network. Each access device is assigned an IP address which, in accordance with an embodiment of the invention, is associated with a particular service or service provider to which the user of the device is subscribed. For example, network access device 301 is assumed to have been assigned, for the purposes of the description herein, an IP address associated with a service provider operating service network 361. Each network access device 301 . . . 304 is either connected to or integrated with a network interface unit 311 . . . 314, e.g., a modem, which enables communication through an access network infrastructure.

In FIG. 3, the access network infrastructure is shown as a hybrid fiber coaxial (HFC) access network 320 connecting the devices to a Cable Modem Termination System (CMTS) 330 with access to a regional broadband access network 340.

Although the invention shall be described herein with particular reference to an HFC broadband architecture, those skilled in the art would readily be able to apply the invention to different communication architectures. The service networks 361, 362 are connected to the access network infrastructure through one or more point-of-connection routers 350. In the embodiment shown in FIG. 1, this egress router 350 in the access network 340 would be responsible for the "policy filtering" (denoted "PF" in FIG. 3) of packets, and there would be a single default route to the point-of-connection router 350 for all service providers. In contrast to FIG. 1, here in FIG. 3 the policy filtering is applied on the ingress. A separate route through the regional broadband access network 340 is defined for each service network. As illustrated by the first table in FIG. 3, the destination address of packets entering the regional broadband access network 340 is retrieved and a lookup conducted in a conventional destination-based routing table. This "local" routing table contains a list of destination addresses known in the regional broadband access network 340. Where the destination is "locally" known, conventional destination-based routing is applied and the packet forwarded to its local destination in the access network.

Where the destination address is not found in the local routing table, then policy filtering is applied, as represented in the next table denoted "PF" in FIG. 3. The policy decision shown in FIG. 3, for example and without limitation, is based on a source address lookup. The source addresses of the packets that are partitioned into blocks of addresses allocated to particular service providers, denoted in FIG. 3 as "ISP 1" and "ISP 2." The "PF" table represents how the policy-filtered packets are mapped to a corresponding virtual network. Where service network 361 is operated by service provider "ISP 1," data packets with a source address allocated to subscribers of ISP 1 are routed using label switching along a default path to a point-of-connection router 350 acting as a provider edge ("PE") device in the virtual network. Likewise, where service network 362 is operated by service provider "ISP 2," data packets with a source address allocated to subscribers of ISP 2 are routed along a default path to a point-of-connection router 350, which can also be acting as a PE device in a separate virtual network. As mentioned above, the point-of-connection routers, e.g., router 350, are situated at the edge of the regional broadband access network 340 and provide connectivity to one or more of the service networks 361, 362. The point-of-connection router 371 consults the forwarding table depicted in FIG. 3 and forwards the packets along an interface connected to a router 371 in service network 361 or a router 372 in service network 362, depending on how the packet received is labeled.

On the other hand, return traffic from the service networks 361, 362 need not be mapped to one of the virtual networks. Where a point-of-connection router 350 receives packets from the interfaces providing connectivity to either service network 361, 362, the point-of-connection router 350 can then simply choose destination-based routing to forward the return traffic back to the addressed subscribers. Return traffic can be routed within the access network 340 using conventional routing techniques without resorting to the policy filtering mechanisms or label switching.

Figure 4:
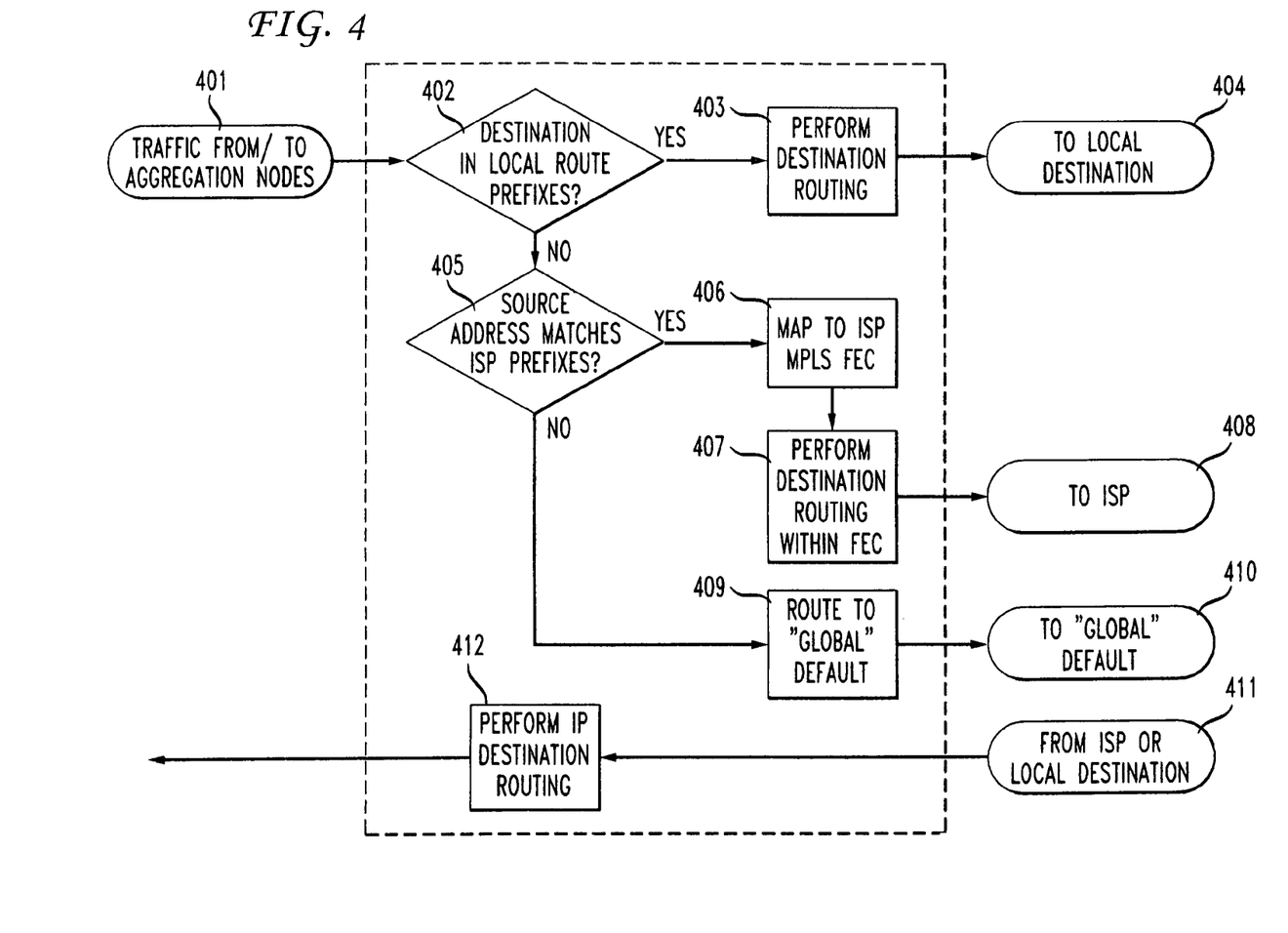
FIG. 4 is a flowchart of processing performed by an MPLS-based policy routing feature in an access network, in accordance with an embodiment of the invention.

FIG. 4 is a more detailed flow chart of processing performed by an MPLS-based policy routing feature in the above-mentioned access network architecture, in accordance with an embodiment of the invention. As described in further detail below, the processing could be implemented at a single ingress node, such as a router, a CMTS or an aggregation node connected to an intra-regional broadband access network, or the processing responsibility divided between more than one node in the access network. At step 401, network traffic is received from an edge of the access network or destined for an edge of the access network. At step 402, an Internet forwarding table is first checked for a route to the destination. This table usually carries all of the "local" access network routes. If the packet destination address matches an entry in the forwarding table, then, at step 403, conventional destination routing can be performed to forward the packet to its "local" destination 404. If the packet destination address does not match any entry in the forwarding table, then the packet can be labeled and mapped to a corresponding "policy" virtual network of the service network/provider of which the subscriber is a member. At step 405, the source address is checked to see if it matches a list of addresses allocated to subscribers of one of the service networks/providers, e.g., the service networks 361 and 362 in FIG. 3. In the context of IP addresses, the service providers would typically be allocated a block of IP addresses specified by a network address prefix and the source address in the packet header would be compared to the particular prefix stored in an access list. If the packet source address matched the address prefix allocated to a particular service network provider, then, at step 406, the packet is labeled and mapped to the MPLS forwarding equivalence class designated for the particular service provider network. At step 407, the packet enters the "policy" virtual network and is routed using label switching to its destination within the FEC, namely towards a POC router or aggregation node connected to the relevant service network 408. Once in the "policy" virtual network (i.e., the packet has been labeled), the packet follows the forwarding table corresponding to the virtual network. The exit pointing to the service network within this network of label switching routers could be the default routes in the forwarding table. If the source address does not match a prefix allocated to a service network VPN, then, at step 409, a "global" default can be provided. The packet can then be routed to the "global" default 410.

On the other hand, incoming data packets to the access network from a service network do not need to be mapped to a policy VPN. Indeed, as step 411 in FIG. 4, network traffic from a service network is routed using conventional IP destination routing techniques at step 412 back to the relevant subscribers.

This is notably in stark contrast to a conventional virtual network application. Reverse traffic does not need to enter the virtual network. In addition, membership in the virtual network is not interference-based. Instead, traffic to the service networks is classified into FECs based on a policy decision such as the source address of the traffic. Moreover, an IP destination-based routing table can be checked first for "local" traffic, regardless of whether the customer is subscribed to a service network associated with a recognized virtual network.

In the embodiment shown in FIG. 4, a global routing table can be provided for local routes and applied to the return traffic. The single table would be updated for each route, and the service network VRFs would only carry the corresponding default forwarding information. In accordance with another embodiment of the present invention, the local routes could be imported into each service network's VRF. This would be at the expense of having several BGP updates for the same routes, since the same local route information would be duplicated in each VRF. In accordance with yet another embodiment of the invention, a separate VRF could be specified for the "local" routes only. Thus, in effect, the policy filtering decision would be combined with the "local" destination lookup decision, so that local packets would be mapped to the corresponding "local" virtual network. Return traffic could also stay within the corresponding VRF.

Implementing the above processing steps in one or more network elements, such as an ingress network router, requires a policy filtering capability built into the network element: i.e., the router should be capable of receiving a packet and forwarding the packet to its next hop based on a policy decision. The next hop, as determined by the network element, could be (a) an interface on the router; (b) an adjacent router; or (c) an MPLS "policy" virtual network. It should also be noted that the invention is not limited to the policy decision specified above of matching the source address to an address prefix allocated to a service provider. The policy decision could be, without limitation, a decision based on the protocol utilized, the incoming interfaces utilized, a type-of-service ("TOS") value, other IP header information, etc. Such an extension would be readily contemplated by one of ordinary skill in the art given the above description. The performance penalty of adding such policy decisions to the ingress network router preferably should be minimal. The required capability should not have to degrade the performance of the router.

Figure 5:
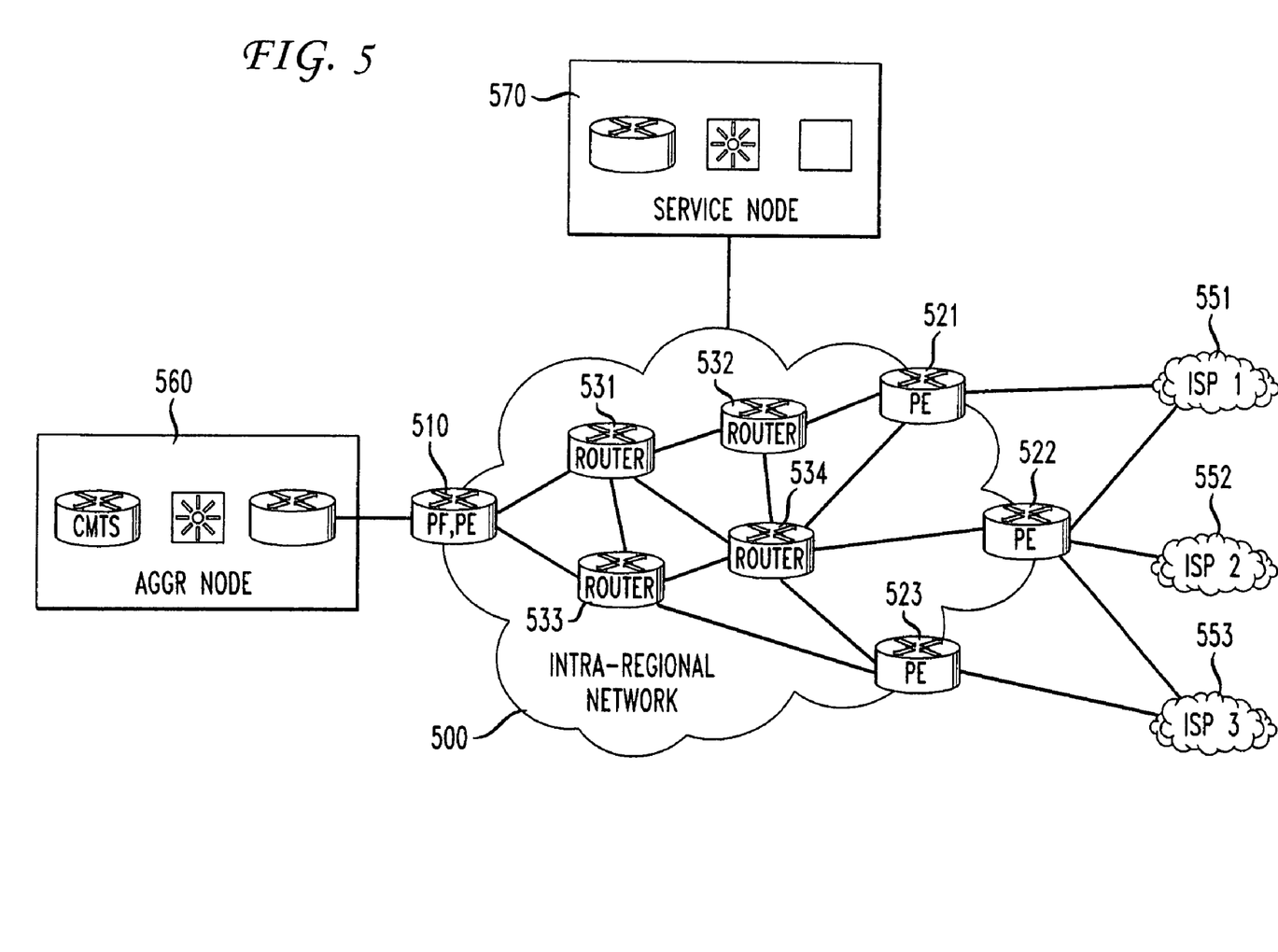
FIG. 5 depicts an implementation of an embodiment of the present invention utilizing a regional access network of aggregation nodes.

There are a number of ways of arranging the network architecture to implement the features described above. FIG. 5, for example, shows an advantageous implementation of the above concepts. The access network comprises a plurality of what are referred to as "aggregation nodes." Each aggregation node 560 comprises one or more broadband headends connected to a number of network access devices that ensure that traffic from subscribers goes through a policy filtering function at a policy/provider edge router, e.g., PF/PE router 510. The PF/PE router 510 is connected to an intra-regional network 500 running MPLS. The network 500 is shown additionally comprising label switching routers 531, 532, 533, . . . 534 and PE routers 521, 522, . . . 523. The PE routers 521, 522, . . . 523 act as points-of-connection to the service networks 551, 552, . . . 553, each of which can be connected to one or more of the PE routers, as depicted in FIG. 5. The separate routing domains, or MPLS VPNs, are constructed between the PE routers 510, 521, 522, . . . 523. Non-local traffic destined for a service network is mapped to an MPLS VPN leading to a POC PE router that is connected to the relevant service network. Local traffic is routed using conventional destination-based routing techniques to local destinations, such as service node 570 which can be a regional data center or a local content site. Reverse traffic from the service networks 551, 552, . . . 553 need not enter into an MPLS VPN.

Figure 6:
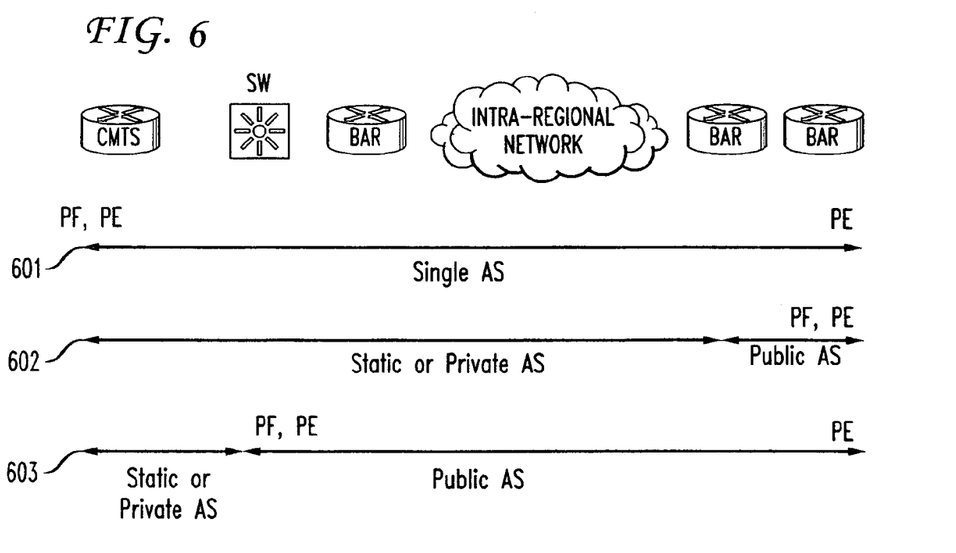
FIG. 6 is a conceptual representation illustrating different implementation options.

FIG. 6 abstractly illustrates various alternatives in applying the above capabilities to an existing access network infrastructure. For example, 601 in FIG. 6 illustrates the following alternative: the policy-based VPN can start at the CMTS, closer to the end-user in the situation where the head-end architecture is being newly built. In this case, policy filtering configurations are local to the CMTS based only on the service network policies (e.g., service provider address subnet) used by the CMTS. The alternative 602 in FIG. 6 illustrates an implementation where the above capabilities are applied to an existing broadband network. A network of point-of-connection routers can be added and attached to the existing network. All traffic bound for a service network has to be routed to the newly-formed network of POC routers that provides policy filtering functions and redundant connections to the service networks. The alternative 603 in FIG. 6, on the other hand, represents how a layer of PF/PE routers can be constructed around an existing intra-regional network. Any traffic entering the intra-regional network from the customers then goes through a router providing a policy filtering function. The intra-regional network is basically transformed into a MPLS core. The arrows in FIG. 6 abstractly represent the different scenarios where the PF and corresponding PE processing can occur.

The present invention has been shown and described in what are considered to be the most practical and preferred embodiments. It is anticipated, however, that departures may be made therefrom, and that obvious modifications will be implemented by those skilled in the art. For example, the detailed description describes an embodiment of the invention with particular reference to MPLS and to an HFC access network infrastructure. However, the principles of the present invention could be readily extended to other protocols and other access network architectures, such as DSL, wireless, satellite, etc. Such an extension could be readily implemented by one of ordinary skill in the art given the above disclosure.

What is claimed is:

1. A node to forward data traffic in an access network, comprising:
   a forwarding table specifying local addresses in the access network;
   a policy filter to associate data traffic with one of a plurality of virtual networks, each of the virtual networks to define a route through the access network to a respective one of a plurality of service networks; and
   a packet processor to choose destination-based routing via a default network different from the plurality of virtual networks for data traffic destined for a local address specified in the forwarding table and for return data traffic received from one of the service networks, and when the data traffic is destined for an address not specified in the forwarding table, to map the data traffic to a selected one of the plurality of virtual networks for communication to a selected one of the plurality of service networks.

2. The node of claim 1, wherein the data traffic is to be mapped using a label switching protocol.

3. The node of claim 2, wherein the label switching protocol is Multiprotocol Label Switching.

4. The node of claim 1, wherein the policy filter decision is to be based on information in a packet header.

5. The node of claim 1, wherein the policy filtering is to be based on a source address in a packet header, the source address to be assigned to a subscriber based on a service provided by at least one of the service networks.

6. The node of claim 1, wherein at least one of the service networks or the access network is to utilizes Internet Protocol and wherein the address to which the data traffic is destined is an Internet Protocol address.

7. The node of claim 1, wherein the selected service network is to be operated by a different service provider than the access network.

8. The node of claim 1, wherein the access network comprises a hybrid fiber coaxial network.

9. A method of forwarding data traffic in an access network comprising a plurality of virtual networks, each virtual network defining at least one route through the access network to a corresponding service network, the method comprising:
   when a destination address in received data traffic is a local address in the access network and when the data traffic is return data traffic from a service network, forwarding, using a first processor, the data traffic using destination-based routing via a default network different from the plurality of virtual networks; and
   when the destination address is not a local address in the access network, policy filtering the data traffic, via a second processor, to map the data traffic to one of the plurality of virtual networks for communication to the corresponding service network.

10. The method of claim 9, wherein the data traffic is mapped using a label switching protocol.

11. The method of claim 10, wherein the label switching protocol is Multiprotocol Label Switching.

12. The method of claim 9, wherein the policy filtering is based on information in a packet header.

13. The method of claim 9, wherein the policy filtering is based on a source address in a packet header, and wherein the source address is assigned to a subscriber based on a service provided by the service network.

14. The method of claim 9, wherein at least one of the service networks or the access network utilizes Internet Protocol and wherein the destination address is an Internet Protocol address.

15. The method of claim 9, wherein the service network is operated by a different service provider than the access network.

16. The method of claim 9, wherein the access network comprises a hybrid fibercoaxial network.

17. The method of claim 9, wherein the first processor is the second processor.

* * * * *